UNITED STATES PATENT OFFICE.

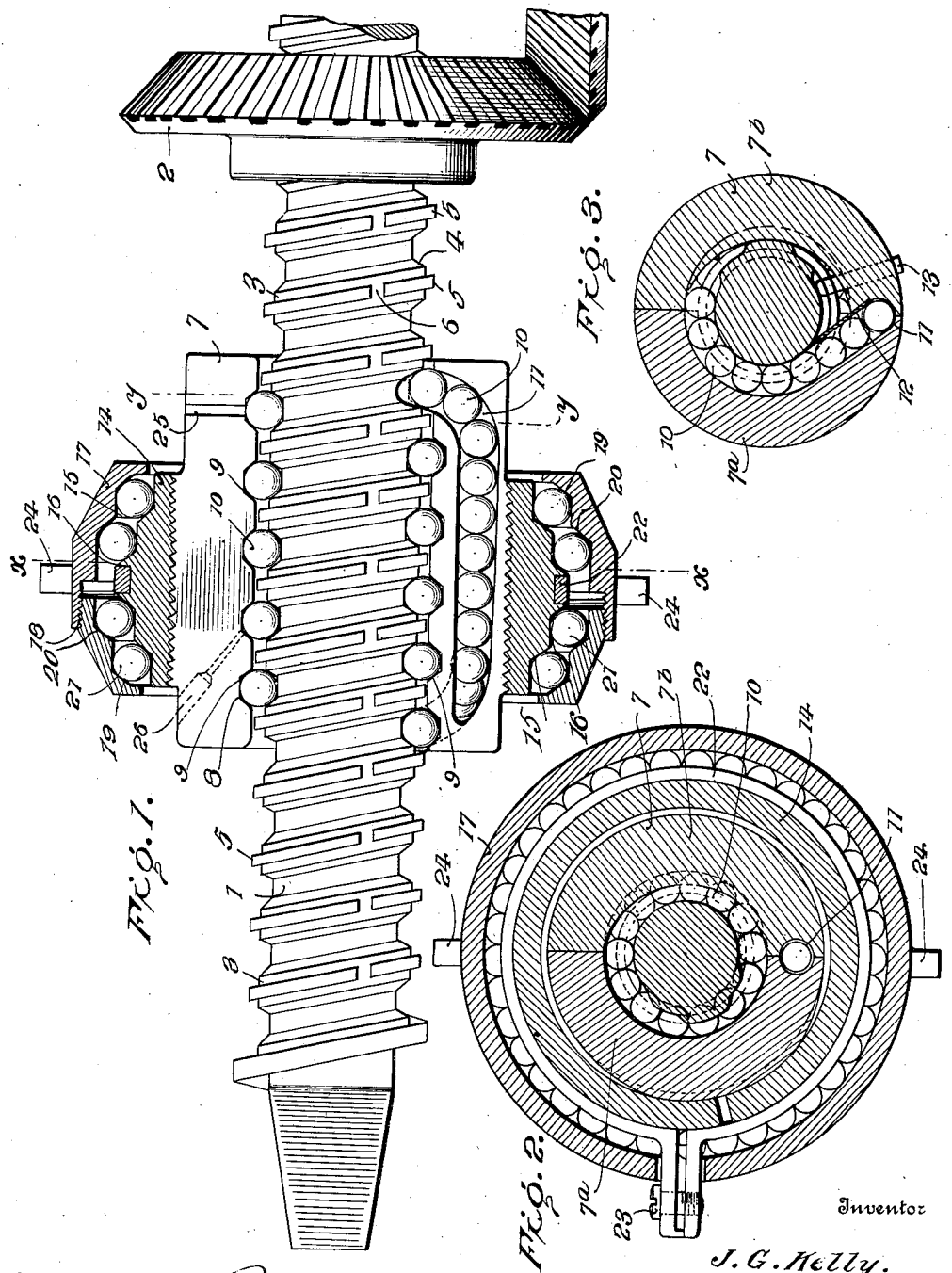

JOHN G. KELLY, OF DURYEA, PENNSYLVANIA.

GEARING.

No. 888,619.    Specification of Letters Patent.    Patented May 26, 1908.

Application filed July 5, 1907. Serial No. 382,292.

*To all whom it may concern:*

Be it known that I, JOHN G. KELLY, a citizen of the United States, residing at Duryea, in the county of Luzerne and State of Pennsylvania, have invented certain new and useful Improvements in Gearing, of which the following is a specification.

The present invention relates to certain new and useful improvements in the design and construction of feeding devices of that type which are employed in connection with a rotary shaft and aims to provide a novel feeding nut which can be applied either to a rock drill, lathe, or other devices requiring a similar mechanism.

The invention contemplates a feeding nut which is peculiarly designed so as to operate with a minimum amount of friction and which carries novel means for cleaning the grooves upon the shaft and preventing dirt and grit from passing into the interior of the nut and interfering with the proper operation thereof.

For a full description of the invention and the merits thereof and also to acquire a knowledge of the details of construction and the means for effecting the result, reference is to be had to the following description and accompanying drawings, in which:

Figure 1 is a longitudinal sectional view through a feeding device embodying the invention. Fig. 2 is a transverse sectional view on the line $x$—$x$ of Fig. 1. Fig. 3 is a similar view on the line $y$—$y$ of Fig. 1.

Corresponding and like parts are referred to in the following description and indicated in all the views of the drawings by the same reference characters.

Specifically describing the invention the numeral 1 designates the shaft which is designed to be rotated by any suitable means such as the gear wheel 2 and which may carry a drill bit or similar tool at one end thereof. A spiral rib 3 is formed upon the exterior of the shaft 1 and the opposite sides of the said rib are inclined as indicated at 4. A second annular rib 5 is located upon the first mentioned rib 3 and is provided upon diametrically opposite sides with the key ways 6 loosely receiving the keys by means of which the gear wheel 2 is secured to the shaft. It will thus be apparent that while the shaft and wheel 2 are caused to rotate together the said shaft is permitted to slide longitudinally with respect to the wheel. A nut 7 fits over the shaft 1 and is provided upon its interior with a spiral groove 8 corresponding to the groove between the spiral rib 3 and having the opposite sides thereof inclined outwardly as indicated at 9. Bearing members such as the balls 10 are interposed between the nut 7 and the shaft and are received within the spiral groove 8 of the nut and the corresponding groove formed upon the shaft between the spiral rib 3. Extending longitudinally through the nut 7 and disposed approximately parallel to the shaft 1 is a ball return-way 11 the end portions of which are extended inwardly and communicate with opposite ends of the spiral groove 8 whereby as the shaft and nut are rotated relatively to each other the balls 10 are picked up at one end of the groove 8 and after passing through the return-way 11 are delivered at the opposite end of the spiral groove 8. A pick up 12 is carried by the nut 7 at each end of the return-way 11 and may be in the nature of a flap projecting into the groove upon the shaft. These pick ups 12 form a guide for causing the balls to pass into the return-way 11 as the nut and shaft are rotated relatively to each other. It will also be observed that a brush 13 is carried by each end of the nut and projects within the groove upon the shaft 1 in advance of the pick up 12 so as to remove all dirt or grit from the shaft which would interfere with the free operation of the rollers. This nut 7 for convenience in manufacture may be formed in two longitudinal sections 7ª and 7ᵇ which are held rigidly together by means of a sleeve 14 threaded upon their exterior. The nut 7 carries an annular enlargement which in the present instance is formed in connection with the sleeve 14 and is provided upon each side with an outer inclined shoulder 15 and an inner inclined shoulder 16. A collar 17 surrounds the sleeve 14 and is formed in two sections which are threaded together as indicated at 18. The interior of this collar 17 is formed with an annular depression corresponding to the before mentioned annular enlargement upon the nut and upon each side of the depression there is formed an outer inclined shoulder 19 and an inner inclined shoulder 20 corresponding respectively to the before mentioned inclined shoulders 15 and 16 upon the nut. A plurality of rings of balls or similar bearings 21 is interposed between the nut and the collar and bear against the various inclined shoulders in a manner which will be readily apparent from an inspection of the drawing.

For the purpose of retarding the rotation of the nut a friction band 22 is carried by the collar 17 and encircles the nut. In the present instance this friction band engages the sleeve 14 and is housed within the collar 17, the ends of the band being extended outwardly through the collar 17 and connected by a clamping member 23. Trunnions 24 project from opposite sides of the collar 17 and are designed to be journaled in any suitable support to admit of the sleeve being readily rotated and reversed.

In the operation of the feeding device the shaft 1 is continuously rotated by any suitable means such as the gear wheel 2 keyed upon the outer spiral rib 5 of the shaft and the collar 17 is mounted upon any suitable support. When the friction band 22 is loose the nut 7 is permitted to revolve freely within the collar 17 and the shaft is not fed forwardly to any appreciable extent. However as the friction band is tightened the movement of the nut 7 is retarded and the shaft 1 is fed forwardly at a rate corresponding to the amount by which the said nut is retarded, the most rapid feed being attained when the nut is rigid with the collar. When the shaft 1 has been fed through the feeding nut for its entire length the entire device may be rotated upon the trunnions 24 and the position thereof reversed, thereby eliminating the necessity for moving the shaft rearwardly by rotating it in a reverse direction. Attention is also directed to the fact that the grooves upon both the shaft and nut have inclined shoulders upon opposite sides thereof which engage the bearings 10, since this construction reduces the friction to a minimum and any thrust upon the shaft acts through the inclined planes and has a tendency to force the balls outwardly and split the nut instead of to strip the thread as in the ordinary construction. It may also be observed that the shaft 1 carries an inner spiral rib for engaging the bearings 10 and an outer spiral rib 5 upon the inner spiral rib and serving as a means for attaching the drive wheel to the shaft. Under some conditions it may be found desirable to provide a duct 25 in the nut 7, the said duct communicating with the spiral groove 8 and serving as an outlet for the discharge of any dirt which might accumulate within the groove. The said nut is also shown as formed with an oil passage 26 by means of which the bearings 10 upon the interior of the nut may be readily provided with a lubricant.

Having thus described the invention, what is claimed as new is:

1. In a device of the character described, the combination of a shaft having a spiral rib thereon the opposite sides of which are inclined, a nut fitting over the shaft and provided with a spiral groove the opposite sides of which are inclined, and balls interposed between the nut and shaft, the said nut being formed with a return-way through which the balls are designed to pass from one end of the spiral groove to the opposite end.

2. In a device of the character described, the combination of a shaft, a spiral rib upon the shaft, a second spiral rib upon the first mentioned rib, a nut fitting over the shaft and provided upon its interior with a spiral groove, balls interposed between the nut and shaft and engaging the spiral groove of the nut and the first mentioned rib upon the shaft, the said nut being formed with a return-way through which the balls are designed to pass from one end of the groove to the opposite end, and means coöperating with the second mentioned spiral rib for rotating the shaft.

3. In a device of the character described, the combination of a shaft, a spiral rib upon the shaft having opposite sides thereof inclined, a second spiral rib upon the first mentioned spiral rib, a nut fitting over the shaft and provided with a spiral groove having opposite sides thereof inclined, balls interposed between the shaft and nut and engaging the said spiral groove and first mentioned spiral rib, the said nut being formed with a return-way through which the balls are designed to pass from one end of the groove to the opposite end, and means coöperating with the second mentioned spiral rib for rotating the shaft.

4. In a device of the character described, the combination of a shaft, a spiral rib upon the shaft, a nut fitting over the shaft and provided with a spiral groove, balls interposed between the nut and shaft, the said nut being formed with a return-way through which the balls are designed to pass from one end of the groove to the opposite end, and a brush carried by the nut and extending between the convolutions of the spiral rib upon the shaft.

5. In a device of the character described, the combination of a shaft, a spiral rib upon the shaft, a nut designed to receive the shaft and formed with a spiral groove and also with a return-way communicating with opposite ends of the spiral groove, balls interposed between the nut and shaft, pick ups carried by the nut for guiding the balls from the groove into the return-way, and a brush carried by the nut and projecting between the convolutions of the rib upon the shaft.

6. In a device of the character described, the combination of a shaft, a feeding nut mounted upon the shaft, a collar for the feeding nut, and a friction band carried by the collar and designed to engage the feeding nut.

7. In a device of the character described, the combination of a shaft, a feeding nut mounted upon the shaft and provided with an annular enlargement having an inclined shoulder upon each side thereof, a collar inclosing the feeding nut and provided upon opposite sides with corresponding inclined shoulders, bearings interposed between the collar and nut and engaging the inclined shoulders, and a retarding device carried by the collar for engaging the nut.

8. In a device of the character described, the combination of a shaft, a feeding nut mounted upon the shaft and provided with an annular enlargement having a plurality of inclined shoulders upon each side thereof, a collar surrounding the nut and formed with an annular depression having a plurality of corresponding inclined shoulders, and a friction band carried by the collar and designed to engage the nut, the said friction band being housed within the nut.

9. In a device of the character described, the combination of a shaft, a spiral rib upon the shaft, a nut designed to receive the shaft and formed with a spiral groove, the said nut also being provided with a return-way communicating with opposite ends of the spiral groove, bearings interposed between the nut and shaft and designed to pass through the return-way from one end of the groove to the opposite end, a collar surrounding the nut, and retarding means carried by the collar and designed to engage the nut.

10. In a device of the character described, the combination of a shaft, a spiral rib upon the shaft, a second spiral rib upon the first mentioned spiral rib, a nut fitting over the shaft and formed with an annular groove and also provided with a return-way communicating with opposite ends of the groove, balls interposed between the nut and sleeve and engaging the spiral groove of the second mentioned spiral rib and designed to pass through the return-way from one end of the groove to the opposite end, a collar surrounding the nut, retarding means carried by the collar for engaging the nut, and means coöperating with the second mentioned spiral rib for rotating the shaft.

11. In a device of the character described, the combination of a shaft, a spiral rib upon the shaft, a nut fitting over the shaft and formed in two sections, a sleeve holding the sections of the nut together, the said nut being provided with an annular groove and also being formed with a return-way communicating with opposite ends of the groove, and balls interposed between the shaft and nut and designed to pass through the return-way from one end of the groove to the opposite end.

In testimony whereof I affix my signature in presence of two witnesses.

JOHN G. KELLY. [L. S.]

Witnesses:
H. S. HILL,
W. N. WOODSON.